(12) United States Patent
Pieper et al.

(10) Patent No.: US 6,955,592 B2
(45) Date of Patent: Oct. 18, 2005

(54) AIR OUTLET DEVICE FOR VEHICLES, IN PARTICULAR AIRPLANES, AND METHOD FOR ASSEMBLING SUCH AN AIR OUTLET DEVICE

(75) Inventors: Udo Pieper, Erwitte (DE); Thomas Kessler, Geseke (DE); Christian Finke, Bielefeld (DE); Rolf Broelemann, Salzkotten (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 0 days.

(21) Appl. No.: 10/392,972

(22) Filed: Mar. 21, 2003

(65) Prior Publication Data

US 2004/0029519 A1    Feb. 12, 2004

Related U.S. Application Data

(60) Provisional application No. 60/379,053, filed on May 10, 2002.

(51) Int. Cl.[7] ............................................. B64D 13/00
(52) U.S. Cl. ......................................... 454/71; 454/76
(58) Field of Search .............................. 454/71, 76, 77, 454/143, 152

(56) References Cited

U.S. PATENT DOCUMENTS

| 2,516,805 | A |   | 7/1950  | Rother et al. |
| 2,672,806 | A | * | 3/1954  | Vehige ......................... 454/76 |
| 2,830,523 | A | * | 4/1958  | Vehige ........................ 454/323 |
| 5,127,876 | A | * | 7/1992  | Howe et al. .................. 454/76 |
| 5,328,152 | A | * | 7/1994  | Castle ......................... 251/229 |
| 5,399,119 | A | * | 3/1995  | Birk et al. ..................... 454/76 |
| 6,645,065 | B2 | * | 11/2003 | Rooney et al. ............. 454/154 |

FOREIGN PATENT DOCUMENTS

| DE | NR. 1 945 095  | 8/1966 |
| DE | DT 23 47 541 A1 | 4/1975 |
| DE | 3626790 C2     | 11/1989 |

* cited by examiner

*Primary Examiner*—Derek S. Boles
(74) *Attorney, Agent, or Firm*—Birch, Stewart, Kolasch & Birch, LLP

(57) ABSTRACT

An air outlet device (1) for vehicles, in particular airplanes, comprises a panel (2) with at least one receiving opening, an air outlet (3) arranged in the receiving opening, and a sealing means (6) sealing the air outlet (3) and the panel (2) against each other. At the panel (2) and/or the air outlet (3), a securing means (8) is configured, it serves to mount the air outlet (3) to the panel (2). During the assembly of the air outlet device (1), the securing means (8) holds the air outlet (3) in a defined position in the panel (2) so that curing adhesives can be used as sealing means (6) without any problem.

14 Claims, 2 Drawing Sheets

AIR OUTLET DEVICE FOR VEHICLES, IN PARTICULAR AIRPLANES, AND METHOD FOR ASSEMBLING SUCH AN AIR OUTLET DEVICE

This application claims priority on provisional Application No. 60/379,053 filed on May 10, 2002, and claims priority under 35 U.S.C. § 119(a) on Patent Application No(s). 102 12 746.8 filed in Germany on Mar. 22, 2002, the entire contents of which are hereby incorporated by reference.

FIELD OF THE INVENTION

The invention relates to an air outlet device for vehicles, in particular airplanes, for aerating a seat, and particularly a mounting aid for the assembly of an air outlet device. Further, the invention relates to a method for assembling such an air outlet device.

BACKGROUND OF THE INVENTION

In airplanes and buses in particular, air outlet devices are used to aerate seats—mostly from above. Thereby, the passenger is able to individually set the fresh air supply for his seat. Examples for such air outlet devices are described in DE-A-36 26 790, DE-A-2 347 541, DE-U-19 45 095, U.S. Pat. No. 2,516,805.

When assembling an air outlet device, it has turned out to be problematic to connect the panel of the air outlet device really tight with the air outlet mostly arranged within the panel in the form of a ball joint. So far, two methods for mounting the air outlet comprising an air nozzle with a holder therefor in the panel have existed. The air outlets are either mounted in a receiving opening of the panel by means of a threaded ring, which, however, is troublesome, since an additional element, namely the threaded ring, is necessary therefore. Moreover, the mounting is relatively troublesome for this reason. Furthermore, the connection with a threaded ring will never be able to be completely airtight. Therefore, screwed air outlet devices are not suitable for a supply by means of so-called air diffuser boxes continuously supplying a plurality of air outlet devices with flowing fresh air, since, caused by minor leakages of the threaded ring, a certain airflow would continuously escape from the air outlet device.

A second possibility for assembling air outlet devices consists in glueing the holder of the air outlet in the receiving opening of the panel. It is true that these air outlet devices are tight, i.e., no undesired air flows escape, but they have disadvantages during manufacture. After the glue has been applied during manufacturing and the air outlet has been set into the receiving opening of the panel, the glue has to cure. During this curing time, the air outlet devices have to be steadied so that the parts glued together (holder and panel) keep their positions during curing. Otherwise, undesired air gaps may develop. Since the air outlet devices are withdrawn from the manufacturing process during the curing time, the production time is undesirably extended correspondingly.

SUMMARY OF THE INVENTION

It is the object of the invention to improve an air outlet device and to simplify its manufacture.

In order to solve this object, the invention suggests an air outlet device for vehicles, provided with a panel with at least one receiving opening, an air outlet comprising a holder arranged in the receiving opening and an air nozzle held thereby, and a sealing means sealing the holder and the panel against each other, a securing means for securing the air outlet at the panel against unintentional relative movements being configured at the panel and/or the holder.

The method according to the invention comprises the following steps:

applying the sealing means to the panel and/or the air outlet, attaching the air outlet to the panel, and securing the air outlet at the panel against unintentional relative movements of air outlet and panel by means of a securing means of the panel and/or the air outlet.

The invention suggests to use a securing means mounted to the panel and/or the air outlet to mount the air outlet to the panel. After a sealing means has been applied to the panel, the air outlet is applied to the panel upon assembling the air outlet device such that the sealing means is located between the panel and the holder of the air outlet. Now, the securing means holds the holder of the air nozzle of the air outlet in the desired position with respect to the panel. Thanks to the securing means, curable adhesives can be used as sealing means without the necessity of interrupting the manufacturing process during the curing time, since the securing means permanently holds the holder of the air outlet in a defined unchanged position relative to the panel.

Since the securing means is configured at the panel and/or the air outlet, it can be manufactured at low costs without the necessity of the production and mounting of an additional part. The mounting of the air outlet device is very simple as well, since the securing means is quasi integrated and no special components are required.

Preferably, the securing means is configured as a kind of bayonet fixing. To this end, at least two receiving recesses are arranged at the panel, and the circumferential surface of the holder comprises at least two projections intended for engaging into the receiving recess. By means of a rotational movement, the projections are screwed into the receiving recesses. In the region of the receiving recess, a lock is provided that fixes the holder of the air outlet in the panel if the rotational movement is continued. This lock prevents, at least up to a certain force, that the holder is able to loosen from the panel by turning back. By means of this securing means in the form of a bayonet fixing, the air outlet can be permanently mounted to the panel with a simple rotational movement.

Alternatively, the securing means can be adapted to be locked in axial direction. Here, the axial direction refers to the receiving opening, i.e., coincides with the path of the escaping air. With this configuration of the securing means, the mounting of the air outlet device is even simpler, since it is possible to do without the rotational movement and the air outlet can be inserted straightly in the receiving opening in axial direction thereof.

Generally speaking, the securing element is thus suitably configured as locking device.

Since the securing means holds the holder of the air outlet and the panel in a fixed position with respect to each other and at a certain mutual distance, elastic sealing means such as, for example, an elastomeric sealing ring, which require a certain bias for sealing, can be used as well.

BRIEF DESCRIPTION OF THE DRAWINGS

Hereinafter, an embodiment of the invention is explained in detail with reference to the drawings. In the Figures.

DETAILED DESCRIPTION OF A PREFERRED EMBODIMENT

Figure 1:
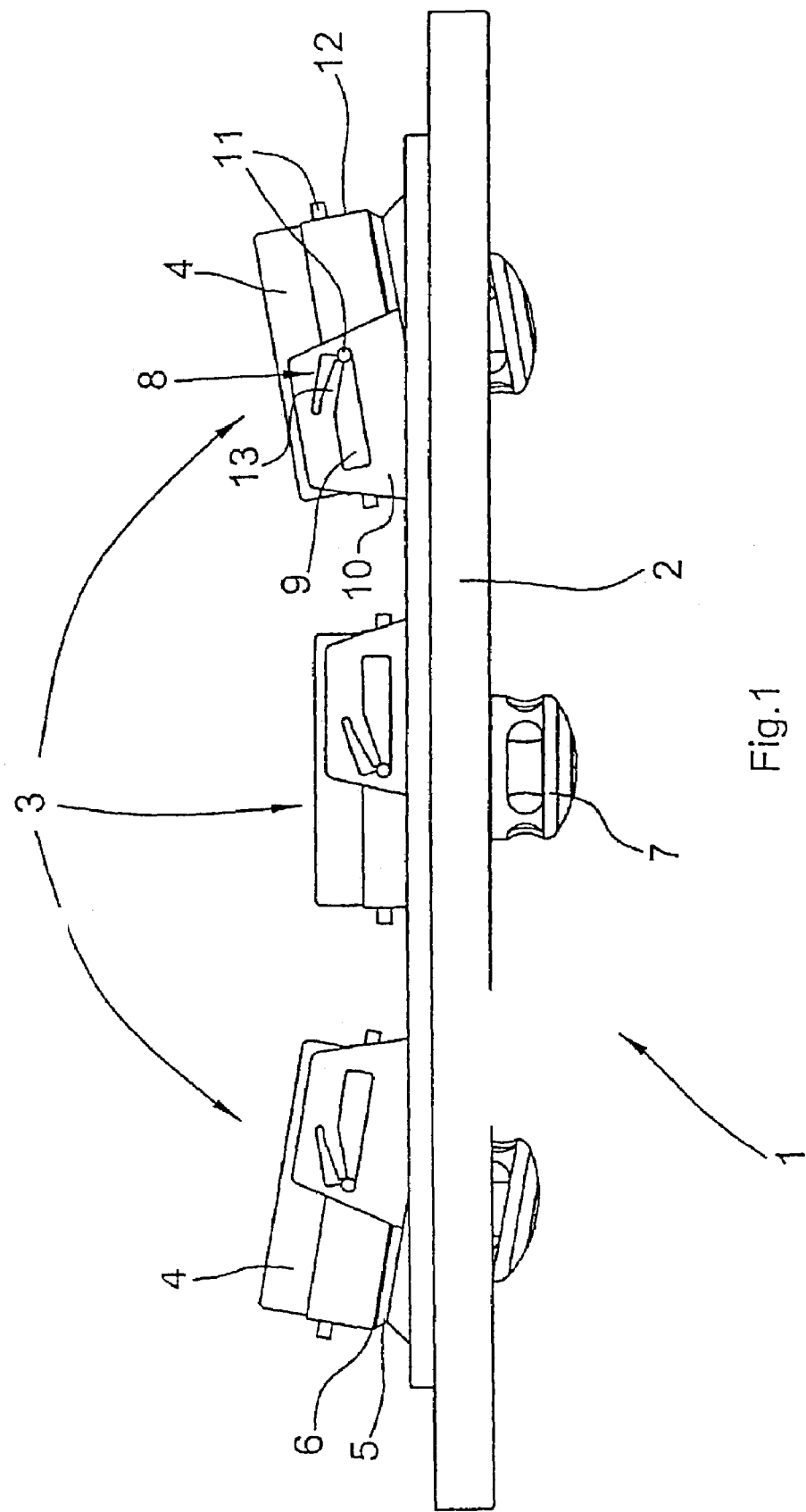
FIG. 1 is a side view of the air outlet device according to the invention, with several air outlets.

In FIG. 1, an air outlet device 1 according to the invention is shown in side view. The air outlet device 1 has a panel 2 accommodating three air outlets 3 in this embodiment. Instead of providing three air outlets 3, it is also possible to provide only one or two air outlets 3 or another number.

Typically, the panel 2 is set into the lining of a vehicle, such as an airplane or a bus, above the seats. Such panels 2, however, can also be installed into instrument panels.

Each air outlet 3 comprises a substantially tubular holder 4 supported on an opening edge 5 of the panel 2. A sealing means 6, a curable adhesive or an elastomeric sealing ring, for example, is located between the holder 4 of the air outlet 3 and the edge 5 of the panel 2. By means of a ball joint not shown here, a nozzle 7 is arranged in the holder 4 the degree of opening of which is adjustable by means of a rotational movement. The nozzle 7 protrudes through a non-illustrated receiving opening of the panel 2 so that the passenger is able to determine the direction and strength of the air flow by means of the nozzle 7.

The air flow supplied to the passenger is supplied to the holders 4 of the air outlets 3 via non-illustrated conduits or channels, passes the holder 4 and escapes through the nozzle 7. The transition between the air outlet 3 and the panel 2 is closed in an airtight manner by means of the sealing means 6. The non-illustrated ball joint seals the nozzle 7 within the holder 4.

By means of a securing means 8, the air outlet 3 is mounted in the panel 2. The securing means 8 comprises several (two in this case) groove-shaped recesses 9 recessed in a wall section 10 of the panel 2, and projections 11 arranged at a circumferential surface 12 of the holder 4 of the air outlet 3. The receiving recesses 9 and the projections 11 are arranged at the same distance to the panel 2 so that the projections 11 are able to engage into the receiving recesses 9. At one end of each receiving recess 9, a lock tongue 13 is provided engaging behind the projection 11 and fixing the air outlet 3 at the panel 2.

Figure 2:
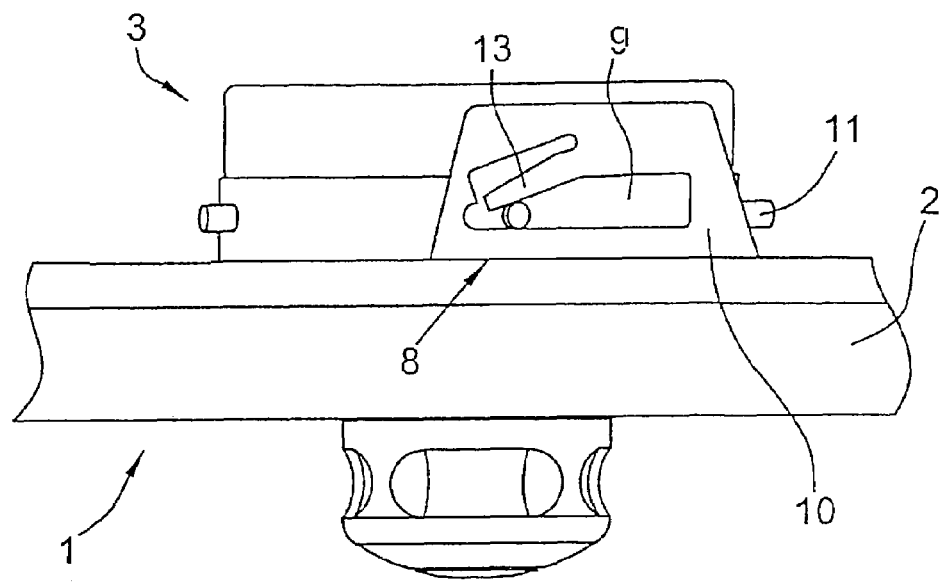
FIG. 2 is an enlarged side view during the mounting of an air outlet.
Figure 3:
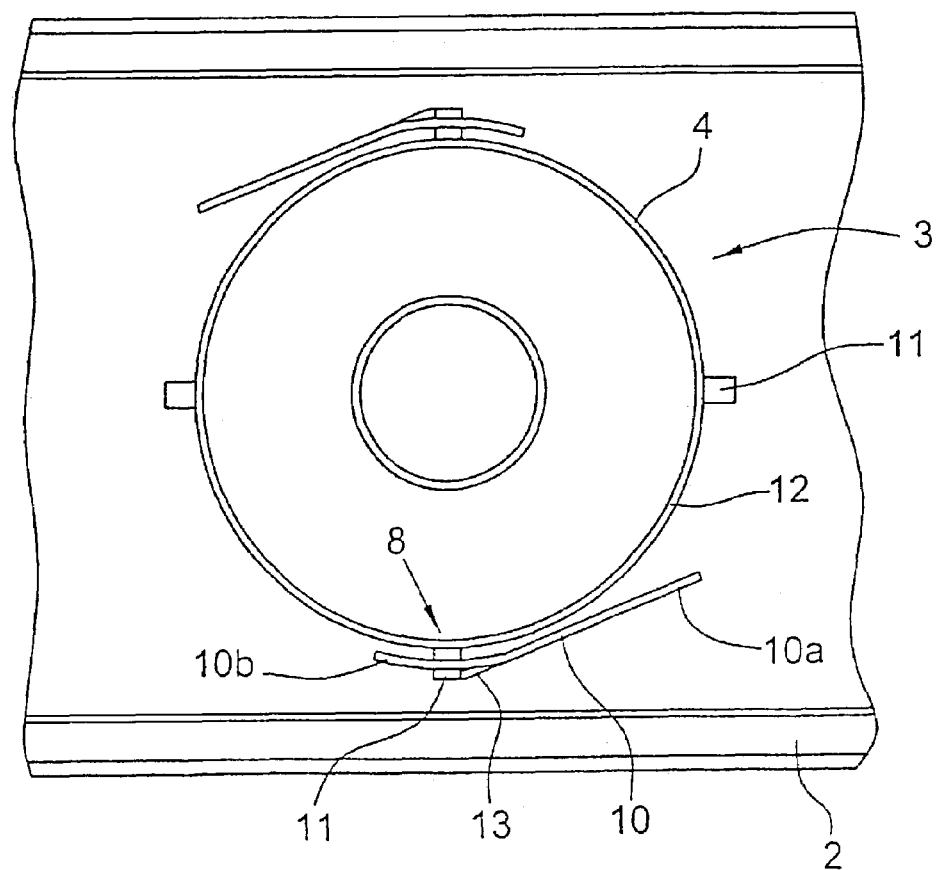
FIG. 3 is a top view onto the air outlet device.

Hereinafter, the securing means 8 will be described in detail with reference to FIGS. 2 and 3.

First, the wall section 10 of the panel 2 extends tangentially to the circumferential surface 12 of the air outlet 3 and thus to the non-illustrated receiving opening of the panel 2 in which the air outlet 3 is located. The receiving recess 9 begins in the tangential region 10a of the wall section 10 and continues up to a radial portion 10b of the wall section 10 the radius of which corresponds to that of the circumferential surface 4. Thus, the projection 11 in the tangential portion 10a is able to gradually engage into the receiving recess 9 by means of a rotational movement of the air outlet 3, the projection 11 completely engaging into the receiving recess 9 in the radial portion 10b. The wall section 10 is spaced so far from the circumferential surface 4 that a rotation of the air outlet 3 is possible without any problem, but close enough for the projection 11 penetrating the receiving recess 9, i.e. rising above the wall section 10 on the side facing away from the air outlet 3. At the end of the receiving recess 9 in the radial portion 10b, the lock tongue 13 is arranged. The lock tongue 13 is configured such in the wall section 10 that it is biased in the direction of the panel 2. During the rotation of the air outlet 3 (FIG. 2), the projection 11 primarily bends the lock tongue 13 upwards so that the projection 11 is able to pass the lock tongue 13. The length of the lock tongue 13 is dimensioned such that the lock tongue 13 is no longer supported on the projection 11 when the projection 11 has reached the outmost end of the receiving recess 9, and thus, due to the bias, engages behind the projection 11 and thus fixes the air outlet 3.

The air outlet 3 is secured against unintentional loosening, since the lock tongue 13 can only be overcome by a certain force. The lock tongue 13 is configured in extension of the tangential portion 10a (FIG. 3) so that it is located laterally beside the radial portion 10b. This results in that the lock tongue 13 engages on the projection near the end thereof. When the air outlet 3 is screwed out, the lock tongue 13 is therefore able to evade both upwards, i.e., away from the panel 2, and outwards, i.e., away from the air outlet 3. Alternatively, the lock tongue 13 may also be configured in the radial portion 10b, of course, so that it is aligned with the radial portion 10b of the wall section 10.

In the described embodiment, there are two wall sections 10 comprising a receiving recess 9 as well as four projections 11 at the air outlet 3 each. In order to increase the stability, several receiving recesses 9 could be provided as well. With four projections 11, a quarter rotation of the air outlet 3 is required at maximum until the latter is fixed at the panel 2. By increasing the number of projections 11, this way can be reduced. Any combination of the number of receiving recesses 9 and projections 11, however, is conceivable.

When manufacturing the air outlet device 1, an adhesive (sealing means 6) is applied to the edges 5 of the panel 2 and thereafter, the air outlets 3 are mounted to the panel 2. To this end, an air outlet 3 is set upon the edge 5 such that none of the projections 11 hinders the complete putting of the air outlet 3 onto the edge 5 by contacting one of the wall sections 10. Now, the air outlet 3 is rotated clockwise, the projections 11 engaging into the receiving recesses 9. The air outlet 3 is rotated until the projections 11 abut on the end of the receiving recess 9 so that the lock tongues 13 are able to engage behind the projections 11. Thereby, the air outlet 3 is held in a defined position on the edge 5 of the panel 2. Subsequently, the air outlet device 1 can be immediately processed further, independent of whether a curable sealing means 6 has been selected. For a curable sealing means 6 is able to cure now during the further processing as well, since the securing means 8 permanently holds the air outlet 3 in a fixed position. Despite the securing of the air outlet 3 at the panel 2, the assembly of the air outlet device 1 is very simple. As with a bayonet fixing, the air outlet 3 merely has to be set into the receiving opening of the panel 2 and only to be rotated until the lock tongues 13 engage behind the projections 11.

What is claimed is:

1. An air outlet device for vehicles, comprising:
 a panel with at least one receiving opening;
 an air outlet comprising a holder, which includes an air nozzle, the holder being arranged substantially onto the receiving opening;
 a sealing means for sealing the holder to the panel to thereby form a substantially airtight seal; and a securing means for fixedly securing the air outlet to the panel, so that the air outlet is fixed in a secured position relative to the panel,
wherein the securing means comprises at least one locking device for an automatic locking latching of the panel to the air outlet.

2. The air outlet device according to claim 1, wherein the securing means comprises at least two receiving recesses arranged at the panel, at least one lock element, and at least two projections arranged at an outer surface of the holder, for immersing into the receiving recesses, the projections being fixable in a latching position in the receiving recesses by twisting the air outlet in a first rotational direction, and at least one of the projections being secured in the latching position against the air outlet being twisted back.

3. The air outlet device according to claim 1, wherein the air nozzle is pivotally arranged in the holder.

4. The air outlet device according to claim 1, wherein the sealing means is an adhesive.

5. The air outlet device according to claim 4, wherein the adhesive is a curing adhesive.

6. The air outlet device according to claim 1, wherein the sealing means is a sealing ring.

7. A method for assembling an air outlet device, the steps comprising:
applying a sealing means to a panel and/or an air outlet;
attaching the air outlet to the panel; and
securing the air outlet fixedly to the panel, so that the air outlet is fixed in a secured position relative to the panel by a securing means,
wherein the securing means comprises at least one locking device for an automatic locking latching of the panel to the air outlet.

8. An air outlet device comprising:
a panel having an aperture formed therein;
an air outlet unit being arranged substantially onto the aperture of the panel, the air outlet unit facilitating air flow towards a passenger compartment of a vehicle;
a seal being provided between the panel and the air outlet unit to thereby form a substantially airtight seal between the air outlet unit and the panel;
a securing device for fixedly securing the air outlet unit to the panel, so that the air outlet is fixed in a secured position relative to the panel; and
a wall portion extending perpendicular to a second side of the panel, the wall portion having an opening formed therein for receiving a projection that is formed on the air outlet unit.

9. The air outlet device according to claim 8, wherein both the seal and the securing device secure the air outlet unit to the panel.

10. The air outlet device according to claim 8, wherein a first side of the panel is directed towards the passenger compartment of the vehicle.

11. The air outlet device according to claim 8, wherein the panel has a plurality of apertures and wherein a plurality of air outlet devices are respectively arranged on the plurality of apertures.

12. The air outlet device according to claim 8, wherein the wall portion is arcuate with respect to a circumferential edge of the air outlet unit.

13. A method of manufacturing an air outlet device, the method comprising steps of:
providing a seal to form a substantially airtight seal between a panel and an air outlet unit;
applying the seal to the panel or the air outlet unit;
positioning the air outlet unit onto the panel so that the air outlet unit substantially envelops an aperture that is formed in the panel and so that the seal is provided between the panel and the air outlet unit; and
rotating the air outlet unit so that at least one projection, which is formed on the air outlet unit, engages with a securing device to thereby fixedly secure the air outlet unit to the panel, so that the air outlet is fixed in a secured position relative to the panel,
wherein a wall portion extends perpendicular to a second side of the panel, the wall portion having an opening formed therein for receiving the projection that is formed on the air outlet unit.

14. An air outlet device comprising:
a panel having an aperture formed therein;
an air outlet unit being arranged substantially onto the aperture of the panel, the air outlet unit facilitating air flow towards a passenger compartment of a vehicle;
a seal being provided between the panel and the air outlet unit to thereby form a substantially airtight seal between the air outlet unit and the panel; and
a securing device for fixedly securing the air outlet unit to the panel, the securing device comprising a wall portion extending perpendicular to a second side of the panel, the wall portion having an opening formed therein for receiving a projection that is formed on the air outlet unit.

* * * * *